No. 882,081. PATENTED MAR. 17, 1908.
J. H. SCHLAFLY.
CORRUGATED METAL CULVERT.
APPLICATION FILED AUG. 27, 1907.
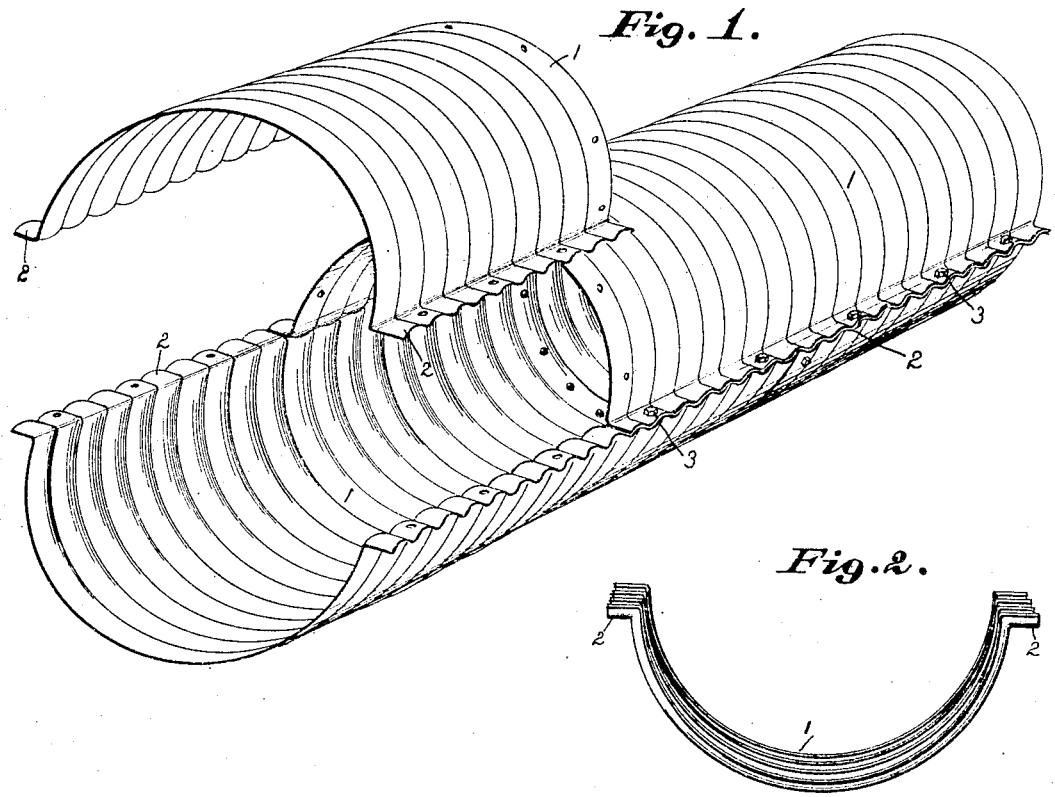
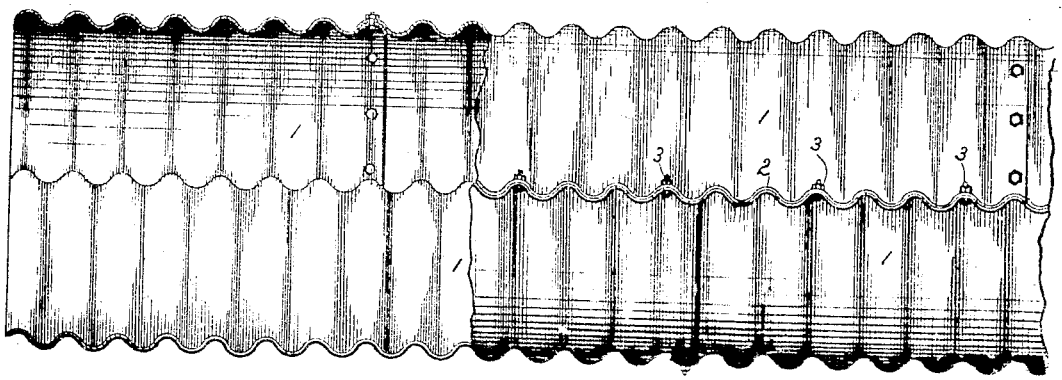
Witnesses
Harry C. Rastetter
Sylvia Boron
Inventor
Julius H. Schlafly
F. W. Bond
By
Attorney

UNITED STATES PATENT OFFICE.

JULIUS H. SCHLAFLY, OF CANTON, OHIO.

CORRUGATED-METAL CULVERT.

No. 882,081.

Specification of Letters Patent.

Patented March 17, 1908.

Application filed August 27, 1907. Serial No. 390,311.

*To all whom it may concern:*

Be it known that I, JULIUS H. SCHLAFLY, a citizen of the United States, residing at Canton, in the county of Stark and State of Ohio, have invented a new and useful Corrugated-Metal Culvert, of which the following is a specification.

My invention has for its object to provide a corrugated sheet metal pipe especially designed for use as a culvert, but it will be understood that it may be applied to other uses, without departing from the nature of the invention.

A further object of the present invention is to so form the members going to make up the culvert that they can be nested and shipped from the factory in a nested condition, thereby reducing the bulk during transportation and at the same time allowing a large number of the members of the sections to be stored in warehouses.

In the drawing, Figure 1 is a perspective view showing a number of members connected together and one member detached. Fig. 2 is a view showing a number of culvert members nested. Fig. 3 is a side elevation showing a portion of the culvert proper in section.

Similar numerals of reference indicate corresponding parts in all the figures of the drawing.

In the accompanying drawings, 1 represent the culvert members or sections, which may be of any desired length and size, which members or sections are formed substantially as shown in the drawings, and each section or member constituting one-half of the circumference of the culvert proper. The sections or members are each provided with the lateral flanges 2, which flanges are for the purpose of providing means for connecting the members together so as to produce a cylindrical pipe.

For the purpose of increasing the rigidity of the members and the finished pipe or culvert, thereby preventing any crushing of the metal constituting the culvert when the same is placed in position for use the various members or sections are corrugated and when the members are connected together at their flanged sides by means of the clamping bolts or rivets 3 the corrugation will be circumferential. The flanges 2 are corrugated, which corrugations are in alinement with the corrugations formed in the segmental members or sections. By corrugating the flanges the various sections or members are easily assembled by simply lapping the adjacent ends of the members or sections. In use I prefer to lap one corrugation over each adjacent member, or section as illustrated in Fig. 3. In some instances it may be desired to rivet the lap ends together, but I do not desire to be confined to this specific manner of connecting the ends together, owing to the fact that there can be no displacement of the members or sections after the flanges 2 have been properly lapped and connected.

It will be understood that the corrugated flanges assist in preventing any relative movement as between what might be termed the upper and lower members or opposite members of the culvert proper. In use the transverse joints or the joints connected at the adjacent ends of the culvert members or sections should be alternated that is to say the joint should not be entirely circumferential, but each joint should be located about midway between the ends of the member or section to which the jointed sections are attached. By providing the lateral flanges and connecting them together the different members constituting the culvert proper, that is to say opposite members come and go at their junctions with the main bodies of the culvert sections thereby providing for a limited expansion without injury to the metal.

Having fully described my invention what I claim as new and desire to secure by Letters Patent, is—

1. As an improved article of manufacture, a culvert section or member constructed of metal and provided with corrugations, flanges provided with corrugations corresponding with the corrugations of the sections or members, substantially as and for the purpose specified.

2. A culvert consisting of a series of sections, said sections or members provided with lateral flanges and the flanges adapted to be connected together and the sections provided with circumferential corrugations, substantially as and for the purpose specified.

3. A culvert consisting of sections, each section provided with lateral flanges and the flanges adapted to be connected together and the sections provided with corrugations, substantially as and for the purpose specified.

In testimony that I claim the above, I have hereunto subscribed my name in the presence of two witnesses.

JULIUS H. SCHLAFLY.

Witnesses:
A. E. HOCKWALT,
GEO. J. SMITH.